March 17, 1925.

A. C. O. BOCK

FINGERPRINT MACHINE

Filed Aug. 17, 1922

March 17, 1925. 1,529,863
A. C. O. BOCK
FINGERPRINT MACHINE
Filed Aug. 17, 1922   7 Sheets-Sheet 5

Alfred Charles Otto Bock, Inventor
By his Attorney Thomas Howe

March 17, 1925.
A. C. O. BOCK
FINGERPRINT MACHINE
Filed Aug. 17, 1922
1,529,863
7 Sheets-Sheet 6
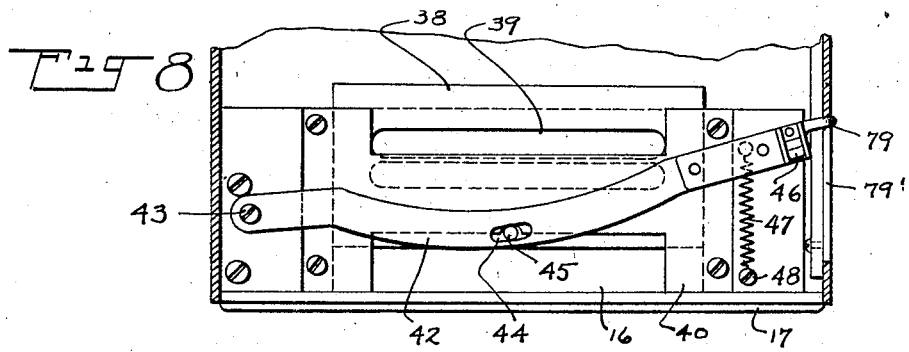
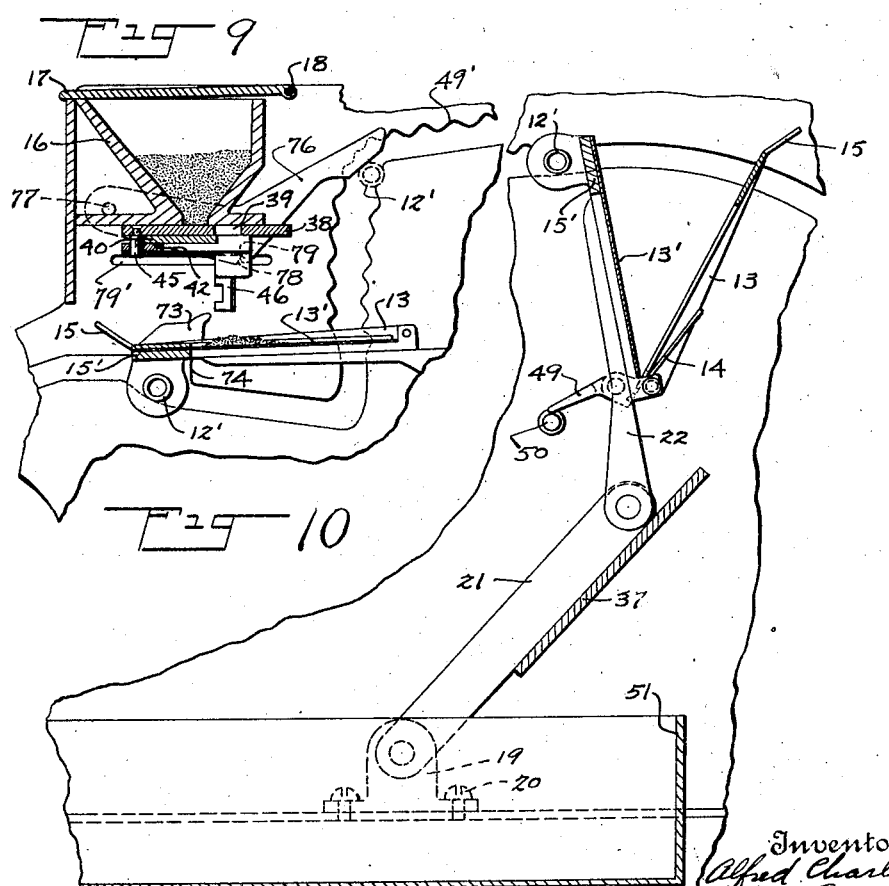

March 17, 1925.

A. C. O. BOCK 1,529,863

FINGERPRINT MACHINE

Filed Aug. 17, 1922

Alfred Charles Otto Bock, Inventor

By his Attorney

Thomas Howe

Patented Mar. 17, 1925.

1,529,863

UNITED STATES PATENT OFFICE.

ALFRED CHARLES OTTO BOCK, OF BROOKLYN, NEW YORK, ASSIGNOR TO FINGERPRINT MACHINE CORPORATION, A CORPORATION OF NEW YORK.

FINGERPRINT MACHINE.

Application filed August 17, 1922. Serial No. 582,332.

*To all whom it may concern:*

Be it known that I, ALFRED CHARLES OTTO BOCK, a citizen of the United States of America, residing at Brooklyn, county of Kings, and State of New York, have invented new and useful Improvements in Fingerprint Machines, of which the following is a specification.

This invention relates to machines whereby the print of a person's finger may be readily and accurately obtained.

The object of the present invention is to provide improvements upon the machine as set forth in the application for patent by Charles F. Glass, Serial Number 418,867, filed October 23, 1920, and another Glass application Serial Number 320,593, filed August 29, 1919, as will be set forth in the following specification, reference being had to the accompanying drawings and appended claims.

In the drawings, which illustrate the invention—

Fig. 8 is a bottom view of the pigment hopper showing the arrangement for discharging pigment from the hopper;

Fig. 9 is a cross sectional view of the hopper and related parts, the feeding slide being shown in position for discharging pigment upon the impression surface;

Fig. 10 is a fragmentary, sectional view of a detail of the device showing a means whereby any superfluous pigment is jarred from the impression surface;

Fig. 13 is a view partially in cross section of a securing member which associates the sheet retaining member with the guide way; and Fig. 14 is a cross sectional view of the catch taken on the line 14—14 of Fig. 4 showing the manner in which the side which is hingedly connected to the base member is secured closed.

Figure 1:
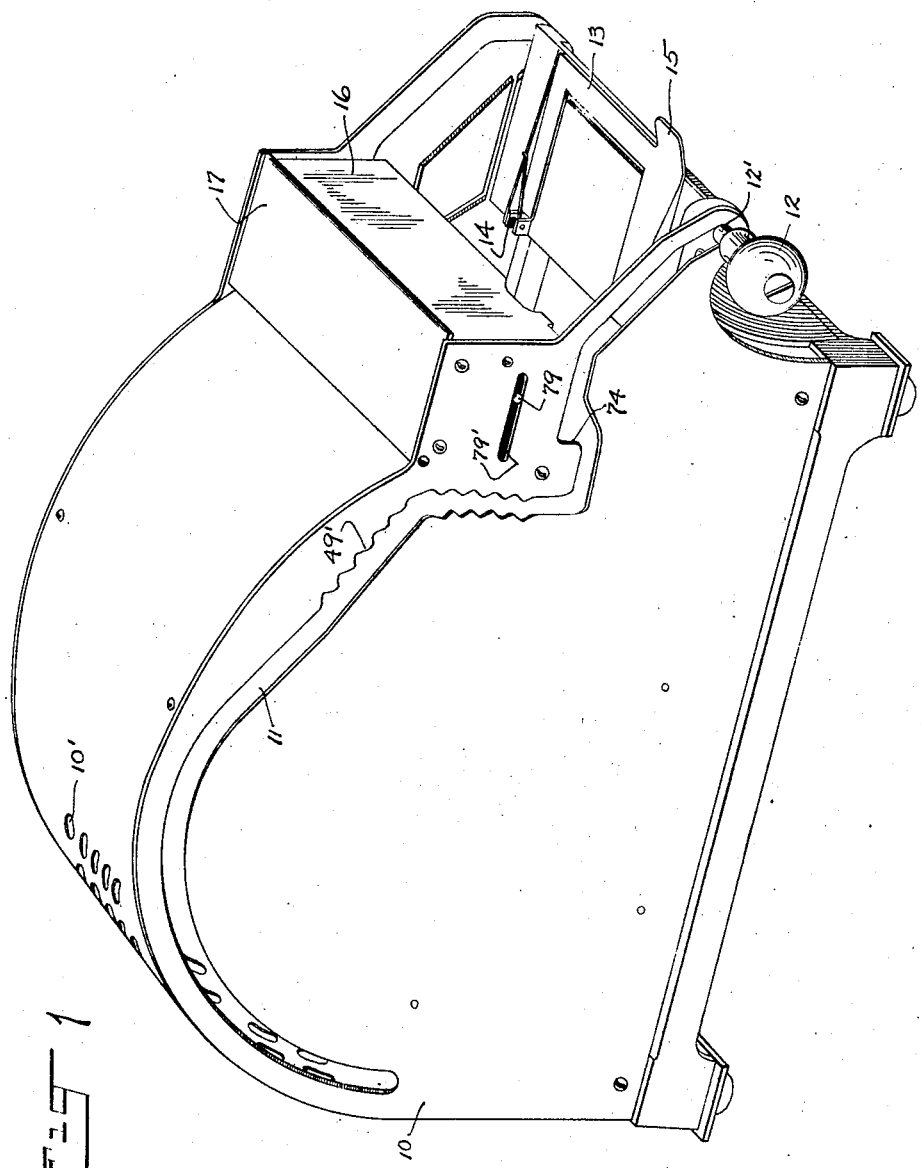
Fig. 1 is a side elevation of the machine.

Referring to the drawings, the purpose of this machine is to record the print of a person's finger and consists generally of an impression surface carrier, means for supplying pigment to that surface and means for fixing or fusing this pigment into the impression surface.

The casing generally designated by the numeral 10, is provided with guide ways in each of two vertical sides. Attention is directed to Figure 1 where the guide way may be best seen. Here it will be noted that a portion of the guide way is corrugated as at 49', the object of which will be explained later. A handle 12 which moves the impression surface is connected to the retaining member 13 by a rod 12' which operates in the guide way 11. 10' denotes a plurality of openings through which heat may pass out, which heat is generated within the casing.

Figure 4:
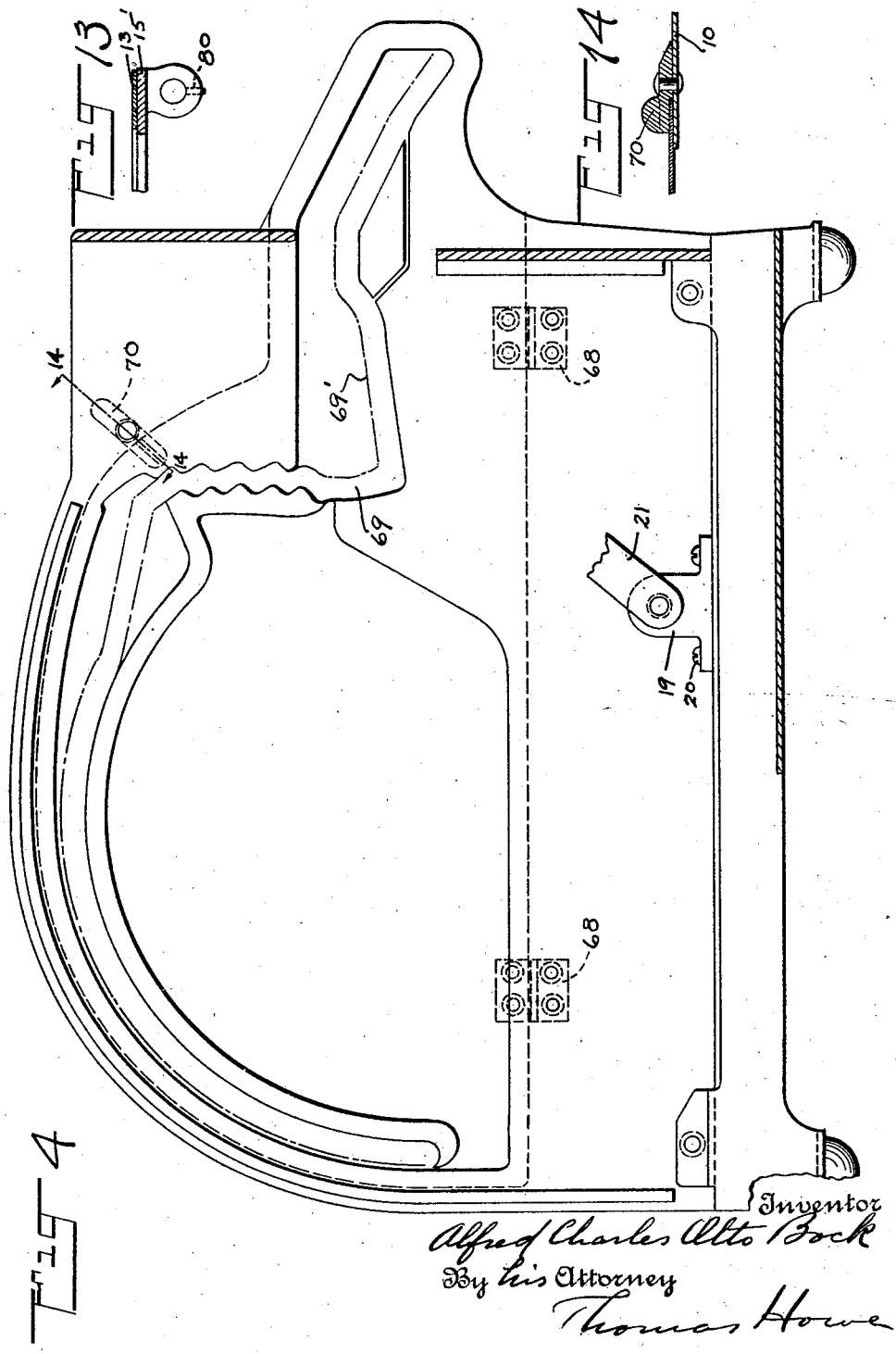
Fig. 4 is a view partly in elevation and partly in section of the interior of the casing side opposite that shown in Fig. 2.

The opposite side of the casing being shown in Figure 4 is of two parts hingedly connected by hinges 68. The guide way 69 allows more freedom of movement than does the guide way on the opposite side. The dash and dot line 69' shows the path of travel of the impression surface retaining member. The numeral 70 designates the catch by which the hinged portion of the side may be locked to the body.

A drawer 51 is provided whereby any excess pigment may be collected. The drawer is situated in the base of the casing and is provided with a knob 52 to facilitate withdrawing. A lug 53 is provided in the base of the drawer and adapted to register with an opening 54 in the casing to insure the drawer against accidental movement.

A hopper 16 is placed on the forward upward part of the casing, the purpose of which is to contain a pigment. The pigment used is in the form of a powder which may consist of asphaltum 6 parts by volume; wheat flour, 4 parts by volume, talc powder, ¼ part by volume and silicon ⅛ part by volume. A cover 17 pivotally connected to the casing at 18 covers the hopper. A slide 38 provided with an opening 39 which is adapted to register with the outlet of the hopper, is slidably arranged directly underneath the hopper, being guided in its movement by the member 40.

As will be seen in Figure 8 a lever 42 is pivotally connected to the underside of the hopper at 43 and provided in its central portion with an elongated opening 44 and carrying at one end a downwardly extending lug 46, being held in normal position by a coil spring 47 which spring is attached to the underside of the hopper by a screw 48. The end of the lever 42 is provided with an outwardly extending lug 79 which operates in a longitudinally extending groove or opening 79' in the casing. Lock means are provided whereby the lever 42 may be held so that the slide 38 is in open position. This is accomplished by the latch 76 which is pivoted at 77, this latch is provided with a notch 78 so that when the slide is moved over to the position shown in Figure 9 the lug 79 will be caught in the notch 78, thereby holding the slide against the force of the spring 47.

The impression surface 13' which may be cardboard, paper or any other suitable material is held by the retaining member 13, lug 15 being provided for the ready movement of the member 13. The spring 14 serves to hold the retaining member in closed relation, or in other words, securely hold the impression surface in place on the support 15'.

Figure 2:
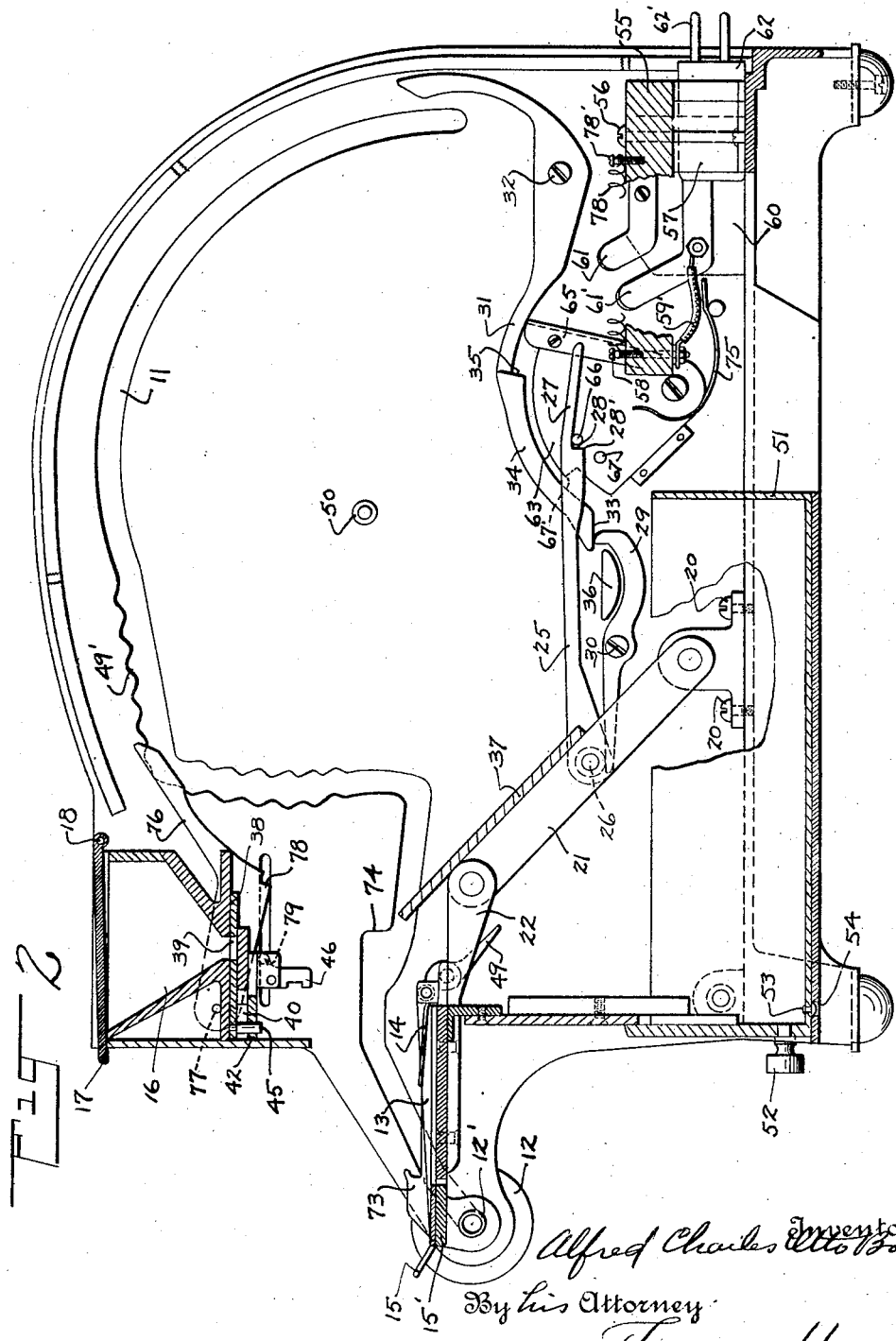
Fig. 2 is a cross sectional view showing the operative arrangement of the parts in normal position.
Figure 3:
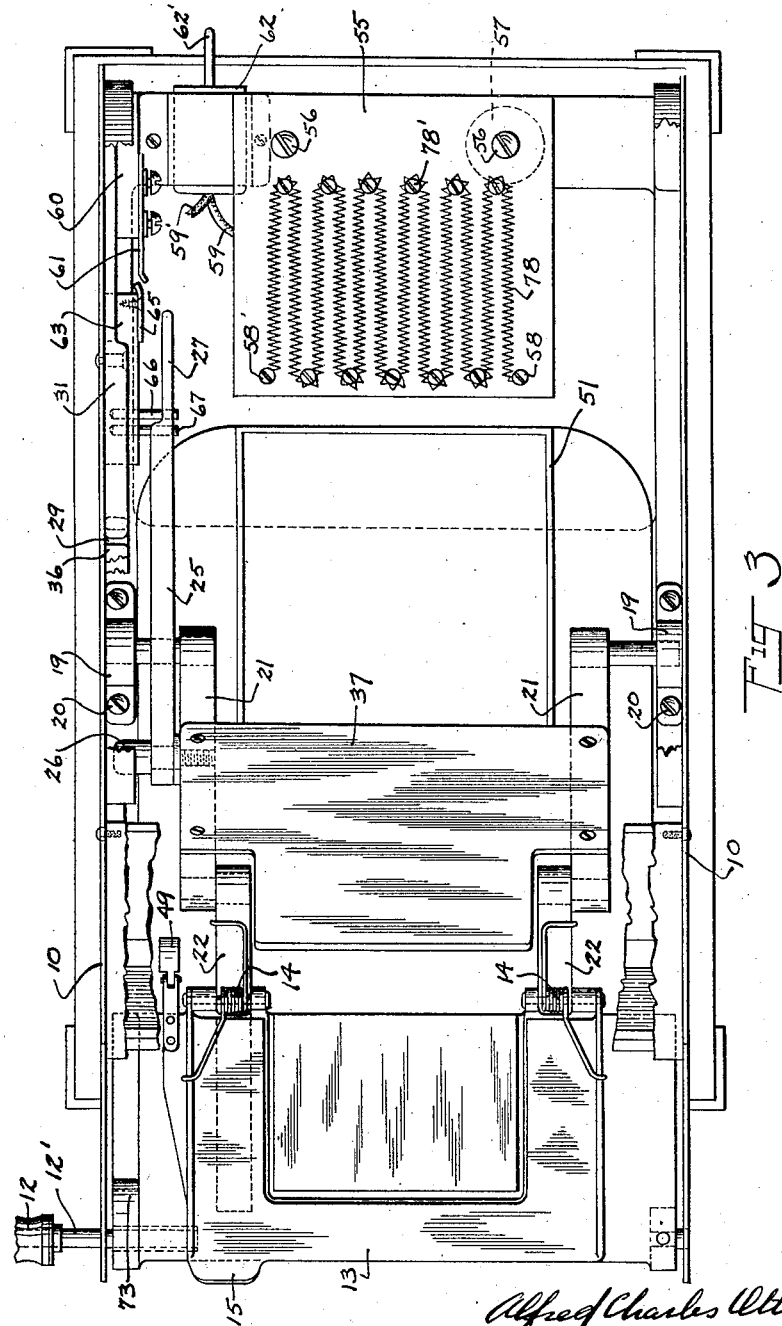
Fig. 3 is a plan view of the machine with the cover and some of the parts removed.

It will be seen in Figure 2 that the retaining member 15' is substantially a continuation of the levers 22, these levers 22 are pivotally connected to a second pair of levers 21, the other ends of which are pivotally connected to blocks 19 which are secured to the base of the casing by screws or the like 20. Plate 37, attached to the lever 21, serves as a guide way or apron for any pigment shaken from the impression surface and guides such pigment into the drawer below.

Between the ends of one of the levers 21 is pivoted a lever 25 at 26. This lever is normally disposed in a horizontal position, and has one end reduced as shown at 27, forming thereby a notch 28, the corner 28' of which is slightly beveled, the purpose of which will be pointed out later. The central portion of the lever 25 is of substantially the same width as the finger 27.

A guide lever 29, pivoted at 30 to the casing has one end bearing against the pivot 26 of the lever 25, the other end being of hook formation. A stop member 36 is provided and disposed within the hook portion of the member 29.

A lock lever 31 of substantially S-shape is pivoted at 32, one end 33 of this lever normally being in contact with the end of the lever 29. An enlarged portion 34 is formed on the lever 31, forming thereby an abutment 35. The opposite end of this lever extends substantially vertical within the path of travel of the impression surface carrier and adapted to be moved by it shortly before the limit of the latter's travel.

The retaining member is provided with a finger 49 which is adapted to engage a lug 50 on the casing about the middle of the carrier's travel. By such engagement the retaining member is thrown outwardly against the force of the spring 14 as shown in Figure 10 (the impression surface remaining in place due to the angle thus formed). The retaining member having passed this position will snap back into position due to the force of the spring 14, striking the paper and jarring off any pigment left on the impression surface as will be more particularly described later.

Figure 5:
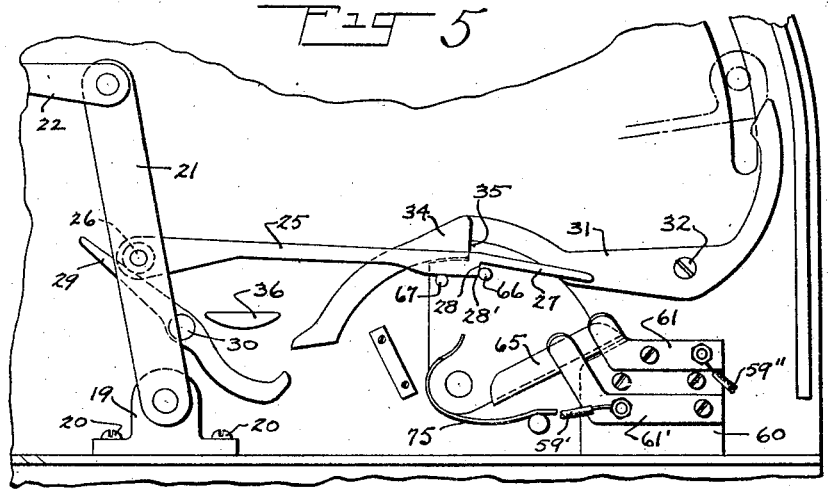
Figure 5 is a fragmentary view in elevation of the switching means for controlling the fixing heaters.
Figure 6:
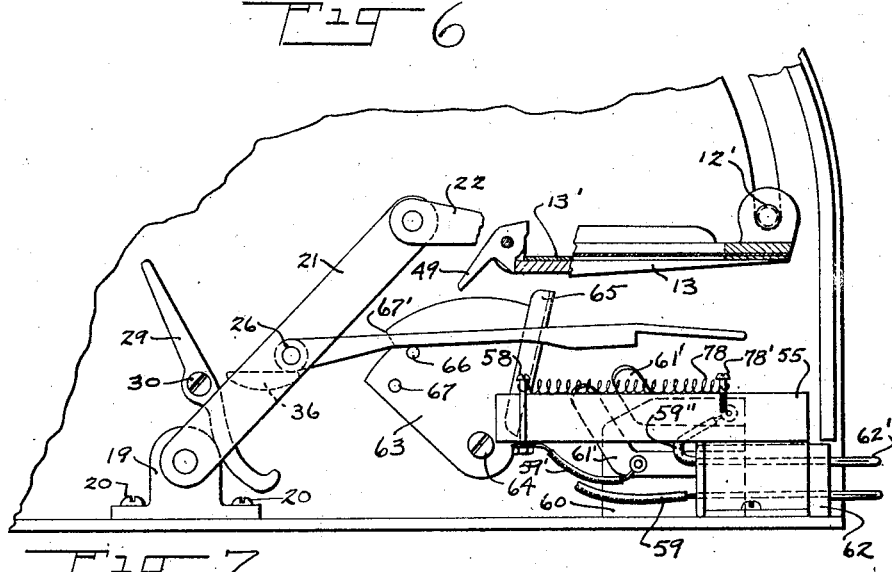
Fig. 6 is a view similar to Fig. 5 but with the parts at a different stage of operation.
Figure 7:
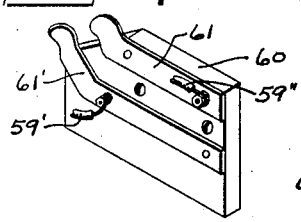
Fig. 7 is a perspective view of the switch contacts for controlling the heating apparatus.
Figure 11:
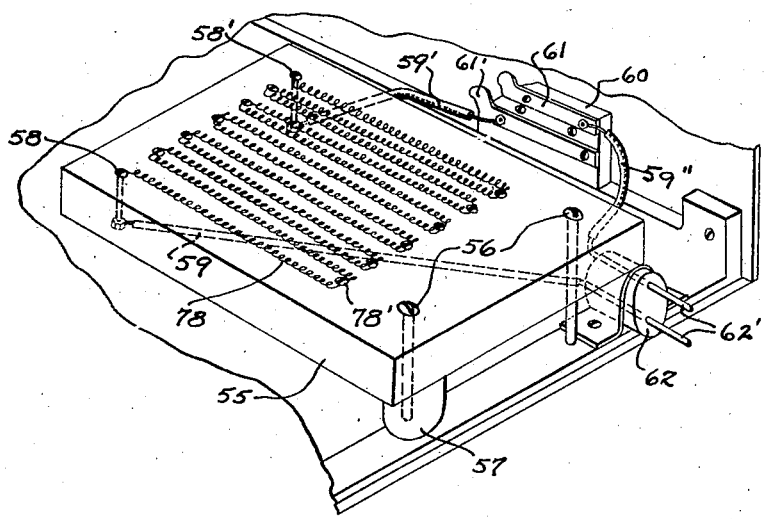
Fig. 11 is a perspective view, in detail, of the heating apparatus.
Figure 12:
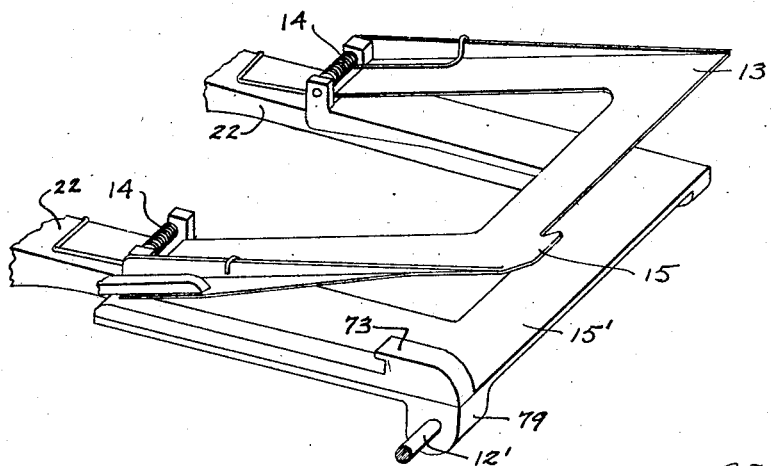
Fig. 12 is a perspective view of the impression surface retaining member.

A fan-shaped member 63 is pivoted at 64 to the lower part of the casing. This member is provided with lugs 66 and 67 and a notch in the upper left-hand corner as viewed in Figs. 2, 5 and 6. An electric switch blade 65 is attached to the opposite side of this fan-shaped member. A spring 75, shown more particularly in Figure 5 operates to hold the fan-shaped member out of operative position with respect to the electric contacts 61 and 61', which are angular in shape and mounted on the insulating block 60.

Attached to these contacts 61 and 61' are wires 59 and 59' which are insulated. Insulating block 55 is attached to the base of the casing and is horizontally disposed with respect thereto. Securing elements 56 serve to prevent this block from accidental movement. A curved porcelain block 57 may be used to further maintain the horizontal position of the block. Secured to the top of this block are a number of electric heater coils 78 which are secured thereto by any suitable means such as screws 78'. Binding post 58 serves as one terminal for the coils 78, the insulated wire 59 being also attached to 58 and extending outwardly to one of the contacts of attachment plug 62. The binding post 58' serves as the other terminal for the heater coils and the insulated wire 59' is also attached thereto, the other end of said wire being attached to the switch contact 61'. 59" designates another insulated wire which is attached to the other contact plate 61, the other end of the wire being attached to the other contact of the plug 62. A source of electricity may be applied to the terminals 62'.

The operating handle 12 is attached to the impression surface support 15' by the bar 12' which is secured to lugs thereon by screws or other suitable securing means 80 (see particularly Fig. 13).

The operation of my machine is as follows:

The pigment is first inserted in the hopper 16. An impression surface is then placed under the impression surface retaining member 13. The person whose fingerprint is to be taken then presses his finger upon such surface and the moisture or excretions on the finger in its natural condition cause the finger lines to be outlined thereon. The operator will then grasp the handle 12, move the same in the guide way upwardly and outwardly until the abutment 74 is reached. By this time the lug 73 which is attached to the retaining member will come in contact with the downwardly extending lug 46 which will be moved horizontally. By such movement the slide 38 will also be moved and upon the registering of the opening 39 in the slide with the outlet of the hopper, the opening 39 will be filled with pigment, and upon further movement of the slide such pigment will be discharged upon the impression surface as shown in Figure 9. The operating handle will now be moved slightly rearwardly to clear it from the lug 46, then downwardly and outwardly in the guide way. The upward travel of the operating handle through the corrugation provided in the guide way will act to agitate the powdered surface and spread the pigment over the impression surface. During this movement the slide 38 is held in open position by means of the latch 76 catching the pin 79. Upon further upward movement of the operating handle, the latch 76 will be lifted by the rod 12' coming against the nose of the latch and the slide 38 be permitted to return under the action of the coil spring 47. During the movement thus far the impressed surface will be turned from a horizontal to a substantially vertical position as shown in Fig. 10 and the agitation caused by the corrugations will cause the pigment to slide over the impression and down the guide way 37 into the drawer below it. Further means are provided for jarring all superfluous pigment from the impression surface, such means being shown in detail in Figure 10, the retaining member 13 being forced outwardly against the action of the spring 14 by the finger 49 coming in contact with the lug 50 and thereafter slapping back into position and jarring the impression surface thereby, only the absolutely necessary pigment being caught by the impressed lines from the person's body will be left, the unused being caught in the drawer below.

During the first movement of the lever 21, the lever 25 will be forced outwardly to come in contact with the lug 28. Further movement of the lever 21 will therefore move the fan-shaped member 63 over towards the contacts 61 and 61' against the action of the spring 75. It will thus be seen that when the switch blade 65 engages the strips 61 and 61', circuit will be formed and the wire 78 heated thereby. Due to the beveled edge 28' the lever 25 will be forced over the abutment 66. By this time the lever 31 will be in close proximity to the fan-shaped member 63 and the abutment 35 over the notch 67'. Therefore when the lever 25 rides over the abutment 66 the lever 31 will drop in place into the notch 67' holding the fan-shaped member in a fixed position, the electric circuit being made. However, further movement of the operating handle will bring the support 15' in contact with the vertical extending portion of the lever 31, and pressure being brought to bear on this lever it will be rotated and the fan-shaped member 63 by the action of the spring 75 will be returned to normal position, and the electric circuit broken.

During the latter movement of the operating handle but before the limit of movement is reached, the impression surface is in inverted position from the position as shown in the beginning, thus the surface with the pigment thereon is directly over the heating apparatus. In this manner the pigment is readily fused, all of the heat being utilized to fuse the pigment, the remaining impression surface being unaffected. The intensity of the heat may be varied in any manner, such as the use of larger or smaller heating wires.

The pivotal connection 26 of the lever 25 in its movement toward the heating apparatus will encounter the abutment 36, and will thereby prevent the lever 21 from further movement in a clockwise direction. Thus, it will be seen, that further movement of the operating handle 12, will cause the lever 22 to be moved, the movement of the lever 21 being checked.

It will be noted, in general, in the operation of this machine that the pigment is first supplied to the impression surface, next the pigment is evenly spread upon such surface and the unused pigment jarred off and caught in the drawer below. Toward the end of the operation the electric circuit is formed causing the wires of a heating apparatus to become hot and at which time the impression surface will tend to be in an inverted position, securing thereby full benefit of the heat. Further movement will bring the impression surface parallel to the heating apparatus and cause the circuit to be broken and the impression surface subjected to a less intensive heat although the amount being sufficient for the purpose required and, the heat being automatically cut off the sheet cannot be injured by over heating no matter how long it may remain in proximity to the heater.

The operating handle is then returned through the guide way to the original position. The impression surface can then be removed from the retaining member in its finished form and the operation repeated indefinitely.

While the invention has been illustrated in what is considered its best application it may have other embodiments without departing from its spirit and is not, therefore, limited to the structures shown in the drawings.

What I claim is:

1. In a finger print recording machine the combination with an impressed surface carrier adapted to carry said surface from the impression to the pigment applying and fixing positions, and means for inverting the said surface in its travel from the pigment applying to the pigment fixing position.

2. In a finger print recording machine, the combination with a casing of an articulated impression surface carrier, one of the members of said carrier adapted to carry said surface, and operating means for said carrier acting thereon through said surface carrying member and guides for directing the movement of said surface carrying member.

3. In a finger print recording machine, the combination with a casing of an articulated impression surface carrier, one of the members of said carrier adapted to carry said surface, and operating means for said carrier acting thereon through said surface carrying member, and guides for directing the movement of said surface carrying member, said guides co-operating with said member to cause inversion thereof during its travel in the operation of said machine.

4. The combination with a finger print recording machine of pigment applying means, pigment fixing means, said fixing means comprising a heater, an impressed surface carrier adapted to carry said impressed surface from the pigment applying to fixing position, and means operated by said carrier for initiating and subsequently discontinuing the heat of said heater during the movement of said surface from the pigment applying to the pigment fixing position.

5. The combination with a finger print recording machine of pigment applying means and pigment fixing means in separated positions, said fixing means comprising an electric heater, an impressed surface carrier adapted to carry said impressed surface from pigment applying to fixing position, and means operated by said carrier for initiating and subsequently discontinuing the heat of said heater during the movement of said surface from the pigment applying to the pigment fixing position.

6. In a finger print machine, in combination an impressed surface carrier, means for applying pigment to said surface, means for moving said surface, heating means for said surface, and means for preventing undue heating of said impressed surface.

7. In a finger print machine, the combination with a carrier for the impressed surface, of means for moving said carrier, pigment fixing means, means on said carrier biased to retain said impressed surface thereon and means for removing said retaining means from said surface between the pigment-applying and pigment-fixing positions and releasing said retaining means whereby its bias causes it to strike the said surface a hammer blow.

8. In a finger print machine, in combination, retaining means for an impressed surface, means for moving said retaining means, a casing provided with a guide way, means for supplying pigment to said impressed surface after a predetermined movement of said moving means, means connected to said retaining means for jarring off unused pigment, means for inverting said surface, and means for heating pigment on said impressed surface while the latter is in an inverted position.

9. In a finger print machine, in combination, a casing provided with a guide way, an impressed surface retaining means, means for moving said retaining means, pigment applying means operated by said impressed surface retaining means, heating means, means for inverting said surface lever means to bring said heating means into operation during the latter movement of said retaining means and means to throw said heating means out of operation when said impressed surface is in an inverted position.

10. In a finger print machine, in combination, an impressed surface carrier, pigment applying means, means for moving said carrier, means for agitating pigment on said surface, heating means horizontally disposed, and means for placing said impressed surface over said heating means in an inverted position.

11. In a device of the class described, in combination, an impressed surface carrier, means for moving said carrier whereby pigment is discharged thereon, heating means normally inoperative, lever means so arranged as to bring into operation momentarily said heating means, whereby said pigment is fixed to said impressed surface.

12. In a finger print machine, in combination, an impressed surface carrier, pigment applying means, a lever pivoted to said retaining means, and provided with a slide way for unused pigment, said lever being pivoted at its opposite end to the base of the casing, a second lever pivoted to said first mentioned lever between its ends, a reduced portion formed on the end of said second lever providing an abutment thereupon, heating means, means for bringing said heating means into operation momentarily, and means for releasing said heating means toward the latter part of the movement of said retaining means.

13. In a finger print machine, in combination, a casing provided with a guide way extending horizontally first then substantially vertically, said vertical portion being jagged in part, and then curved outwardly and downwardly, said outwardly curved portion being jagged in part, an impressed surface, means for moving said surface in said guide way, pigment applying means, means for inverting said surface and means for fixing pigment on to said surface when said surface is in an inverted position.

14. In a finger print machine, in combination, a casing provided with a guide way, said guide way extending horizontally first, then substantially vertical, and then curved outwardly and downwardly, an impressed surface carrier adapted to move in said guide way, pigment applying means and means for fixing said pigment on to said surface.

15. In a finger print machine, in combination, an impressed surface carrier, pigment applying means, means for jarring off unused pigment from said impressed surface, said means comprising an abutment on the side of the casing and spring controlled means attached to said carrier whereby the paper retaining means will be momentarily released in its travel from the pigment applying to the pigment fixing position and thereafter slapped against said surface, and fixing means whereby said pigment is fixed to said surface when the latter is in an inverted position.

In testimony whereof I have signed this specification this 28th day of July 1922.

ALFRED CHARLES OTTO BOCK.